United States Patent
Bönning et al.

[11] Patent Number: 6,042,193
[45] Date of Patent: Mar. 28, 2000

[54] WELDED VEHICLE WHEEL

[75] Inventors: Meinhard Bönning; Ralf Duning, both of Solingen; Klaus Modricker, Meinerzhagen, all of Germany

[73] Assignee: Mannesmann Aktiengesellschaft, Düsseldorf, Germany

[21] Appl. No.: 09/084,035

[22] Filed: May 22, 1998

[51] Int. Cl.[7] .................................................. B60B 3/00
[52] U.S. Cl. ...................... 301/63.1; 29/894.322
[58] Field of Search ............... 301/63.1; 29/894.321, 29/894.322

[56] References Cited

U.S. PATENT DOCUMENTS

| | | | |
|---|---|---|---|
| 1,977,567 | 10/1934 | Eksergian | 29/894.322 |
| 3,601,450 | 8/1971 | Baker | 301/63.1 |
| 5,417,476 | 5/1995 | Hasegawa et al. | 301/63.1 |
| 5,431,486 | 7/1995 | Kamahori | 301/63.1 |

*Primary Examiner*—Russell D. Stormer
*Attorney, Agent, or Firm*—Cohen, Pontani, Lieberman & Pavane

[57] ABSTRACT

A welded vehicle wheel includes a center or wheel disc and a rim. The center has a side wall area at an outermost circumference of the wheel disc having an increasing diameter toward an inner side of the welded vehicle wheel. A substantially axially disposed circumferential portion is connected to the inner end of the side wall area. The rim includes a bed region with a decreasing diameter toward the outer side of the welded vehicle wheel. In the assembled state, the rim is connected to the center by a press fit between the outer side of the circumferential portion and the bed region and by a welded seam between the free-end of the circumferential portion and the bed region. The press fit and welded seam form a space therebetween that is circumferentially continuous and expands in cross-section toward the inner side of the welded vehicle wheel.

15 Claims, 2 Drawing Sheets

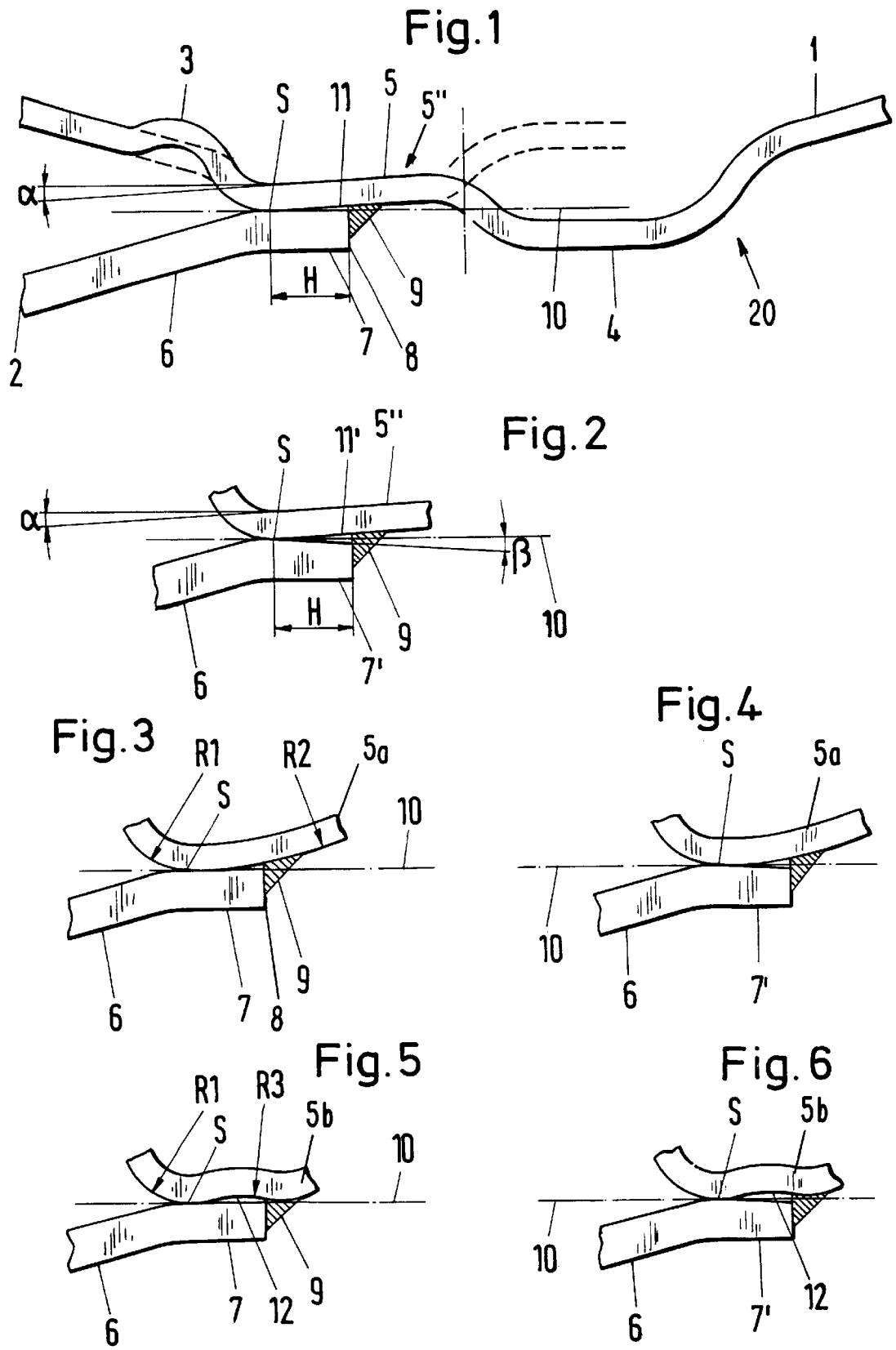

WELDED VEHICLE WHEEL

BACKGROUND OF THE INVENTION

1. Field of the Invention

The invention relates to a welded vehicle wheel with a rim connected to a wheel disc.

2. Description of the Prior Art

Generally, a welded vehicle wheel is produced by connecting an outer ring-shaped circumferential part of a center or wheel disc to an interior bed region of a rim by a pressure seat, and then welding a front of the outer ring-shaped circumferential part along the interior bed region of the rim with a welded seam. Depending on the intended use, the welded seam may comprise a single continuous welded bead or may comprise several welded bead sections. A problem of this prior art wheels is that residues of machine oil and/or cleaning agents that are deposited on the center and rim during cold forming evaporate very quickly during welding and build up a high internal pressure between the center and the rim during production of the prior art wheel. The gaseous reaction products may also penetrate the molten part of the weld and form undesired pores and/or gas bubble inclusions that diminish the fatigue strength of the welded seam. This problem may be avoided by thoroughly cleaning and drying the rim and the wheel disc before establishing the pressure seat connection. Another problem is that high friction forces are created during production of the pressure seat connection and lead to impermissible metal wear in the area of the pressure seat. Reducing the oversize of the wheel disc to lower the friction forces is not a satisfactory solution, because doing so sharply diminishes the effect of the pressure seat and places the welded seam under greater stress. In the worst case, a break of the welded seam can result.

To avoid the undesired formation of pores and/or gas bubble inclusions during connection welding between the rim and the center, German reference DE 43 38 616 A1 provides wedge-shaped recesses arranged at a distance from one another on the outer circumferential part of the center. These recesses allow the gaseous reaction products created during welding to escape. The problem of this proposal is that the gaseous reaction products are able to escape only at discretely arranged points, and that producing the recesses requires an extra work step.

U.S. Pat. No. 5,417,476 discloses another solution. In this design, nobby strips that extend around the circumference are impressed in the outer circumferential part of the center and rest on the inner side of the rim. A space between two sequentially arranged strips in a manner similar to the recess, for the escape of the gaseous reaction products. However, the escape of the gaseous reaction products is hindered because the frontal area of the outer circumferential part also rests on the inner side of the rim. Depending on the nature of the surface and the pressing pressure, this contact may produce a tight metal seal. Another problem with this arrangement is this type of contact creates an undefined seat between the circumferential part of the center and the rim.

Japanese reference JP 07304301 A discloses that the gaseous reaction products created during welding are extracted via ring grooves in the rim and the circumferential part of the center. The ring grooves partially overlap in the axial direction so that in the circumferential direction a continuous gap is created between the inner side of the circumferential part and the point or welded seam. The circumferential part thereby rests only in an axially narrow zone of its outer starting region on the bed region of the rim in the form of a pressure seat connection. Producing the ring grooves requires an extra work step.

SUMMARY OF THE INVENTION

It is an object of the invention to provide a welded vehicle wheel wherein the connection between the rim and the center is designed so that the formation of pores or gas bubble inclusions in the welded seam is avoided and a defined pressure seat is established between the rim and the center.

The object is met by a welded vehicle wheel having a rim and center or wheel disc, wherein the wheel disc includes a side wall area at its outermost circumference having an increasing diameter toward the inner side of the wheel and having a circumferential part connected on its end. The circumferential part extends substantially axially from the side wall area and is connected to a bed region of the rim. The bed region has a decreasing diameter toward the outer side of the wheel and is connected to the circumferential part by a pressure seat connection where the circumferential part connects to the side wall area and by a welded seam along the free end of the circumferential part. The pressure seat connection is disposed along an axially narrow area and an intermediate space exists between the bed region and the circumferential part over a distance between the pressure seat connection and the welded seam continuously along the circumferential direction.

According to the invention, only an axially narrow zone of the outer side of the circumferential part rests on the bed region of the rim in the form of a pressure seat. Because the bed region of the rim located in the connection area is embodied in a conical or toroidal fashion, and because the circumferential part runs exactly horizontally or, on the other hand, conically, an intermediate space is formed between the contact point and the welded seam. A cross-section of the intermediate space expands toward the welded seam. The intermediate space extends around the entire circumference, so that the gaseous reaction products created during welding escape unhindered. This arrangement has the advantage that no special work step is required to create the intermediate space. It is also advantageous that the proposed type of pressure seat produces a defined seating area on a small encircling surface and creates a defined lever arm to the welded seam. The introduction of force occurs mainly in this narrow seating area and is separated from the welded seam by a certain distance. The welded seam serves for force transmission and for fixing the center in the rim. The drawing-in of the center into the rim is made easier, because the parts to be drawn in can be lubricated without the danger of that pores and/or gas bubble inclusions will form. The fact that lubrication is permitted enables the selection of a large oversize of the center, so that the pressing pressure is increased accordingly and the action of the pressure seat fully develops. The narrow defined zone of contact at which the pressure seat occurs is approximately 2–3 mm. An angle $\alpha$, which equals half the conical angle of the bed region of the rim, and an angle $\beta$, which equals half the conical angle of the conical circumferential part, are each less than 7 degrees.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar element:

FIG. 1 is a partial longitudinal sectional view of a first embodiment of a welded vehicle wheel according to the invention;

FIG. 2 shows the embodiment of FIG. 1 with a conical circumferential part;

FIG. 3 is a partial longitudinal sectional view of another embodiment of a welded vehicle wheel according to the invention;

FIG. 4 shows the embodiment of FIG. 3 with a conical circumferential part;

FIG. 5 is a partial longitudinal sectional view of yet another embodiment of the welded vehicle wheel according to the invention; and FIG. 6 shows the embodiment of FIG. 5 with a conical circumferential part.

DETAILED DESCRIPTION OF THE PRESENTLY PREFERRED EMBODIMENTS

Figure 1A:
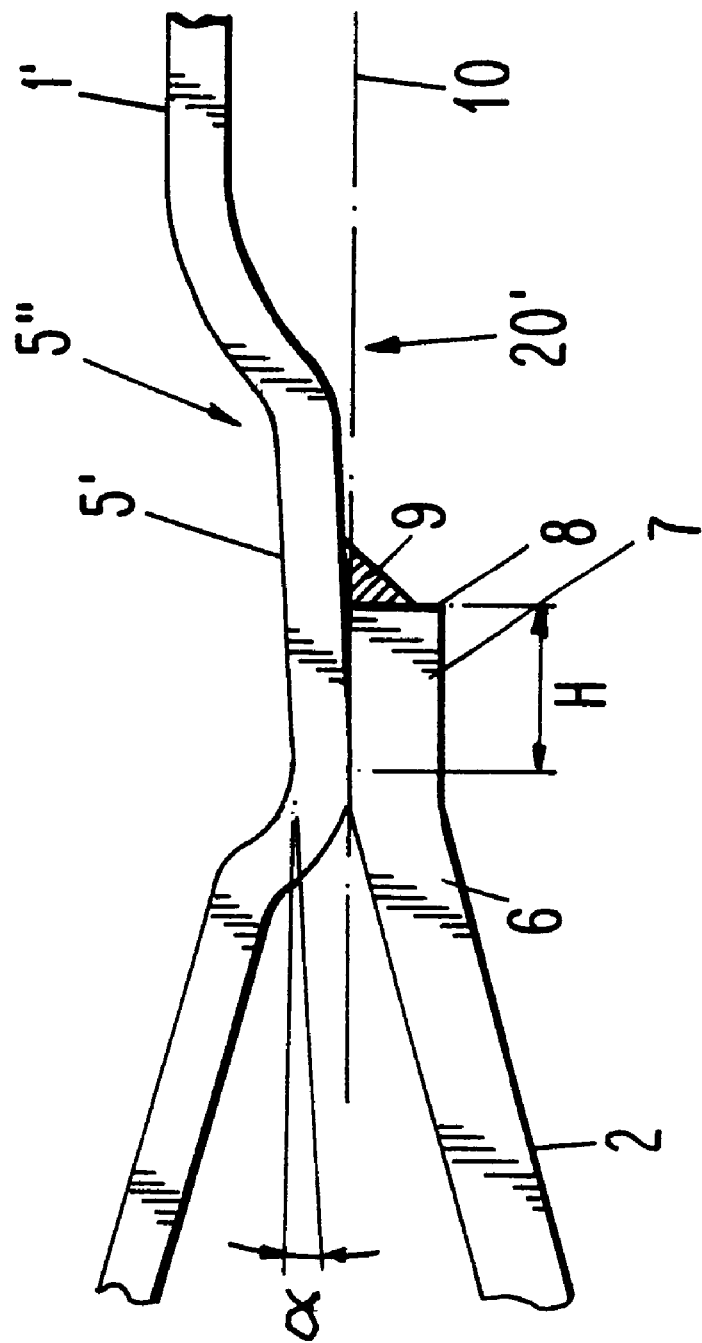
FIG. 1a is a partial longitudinal sectional view of a second embodiment of a welded vehicle wheel according to the invention.

Referring initially to FIG. 1, a welded vehicle wheel 20 according to the invention comprises a rim 1 and a center 2 (center 2 may also be referred to as a wheel disc). In a first embodiment shown in solid lines, the rim 1 includes a hump 3, a deep bed 4 and a ledge region 5; the deep bed 4 and the ledge region 5 comprise a well region of the rim 1. A second embodiment shown in FIG. 1a indicates that the rim 1' may be embodied without the hump 3. The second embodiment is a typical embodiment for automobiles in that the connection area between the rim 1' and the center 2 is located in a well comprising a deep bed region 5' of the automotive rim 1'. The first embodiment is a typical embodiment for trucks, wherein the connection point is located in the ledge region 5. Depending on the type of rim 1,1' to be used, either the ledge region 5 or the deep bed region 5' is used to connect the rim 1,1' to the center 2. Therefore, the ledge region 5 and deep bed region 5' will be generically referred to as bed region 5", indicating that the invention may be embodied with either the rim 1 with the ledge region 5 or the rim 1' with the deep bed region 5'.

According to the invention, the bed region 5" is embodied as a conical section, i.e., a section of a cone, whereby the portion with the narrowmost diameter is located on the outer side of the vehicle wheel 20. FIG. 1 shows only the side wall area 6 with an increasing diameter and the attached ring-shaped circumferential part 7 of the center 2. The circumferential part 7 runs substantially axially. The center 2 and the rim 1 are connected to each other by a welded seam 9 arranged on the free end part 8 of the circumferential part 7. According to the invention, the pressure seat S is limited to an axially narrow zone (in the range of 2–3 mm) and is located in the beginning region of the circumferential part 7 adjacent the connection point between the side wall area 6 and circumferential part 7. The dashed-dotted line 10 is parallel to the axial direction of the vehicle wheel 20 and indicates that the circumferential part 7 runs exactly horizontally. However, because the bed region 5" is embodied in a conical fashion, an intermediate space 11 forms extending around the entire circumference of the vehicle wheel 20. The intermediate space 11 is wedge-shaped when viewed in cross section. If the welded seam 9 is welded after the center 2 has been pressed into the rim 1, the gaseous reaction products escape unobstructed toward both sides via the intermediate space 11. Not until the start of the welded seam 9 is connected to the end of welded seam 9 is the intermediate space 11 sealed. However, because this area has been sufficiently heated by the initially deposited welded bead, it is presumed that when the final seam is approached, no disruptive gaseous reaction products will be formed.

FIGS. 2–6 show various embodiments of the welded vehicle wheel 20 according to the invention shown in FIG. 1. The same reference numbers are used for the same parts.

FIG. 2 differs from FIG. 1 only in that a circumferential part 7' is embodied in a conical fashion and the angle β, between the circumferential part 7' and line 10 which corresponds to half of the cone angle, is less than 7 degrees. As a result, the intermediate space 11 is enlarged.

In the example in FIGS. 3 and 4, the bed region 5a is embodied in a toroidal form. The portion of the a bed region 5a located in the area of the pressure seat 7 has a radius of curvature R1. The portion of another bed region 5b attached thereto has a radius of curvature R2, where R2 can be equal to, smaller than or greater than R1.

FIG. 4 differs from FIG. 3 only in that the circumferential part 7' is embodied in conical fashion.

A further variant is shown in FIGS. 5 and 6. In this example, the bed region 5,5' has a bulge 12 extending radially outward and having a radius of curvature R1. The radius of curvature R3 can be equal to the radius of curvature R1, or can be smaller or larger than the radius of curvature R1.

FIG. 6 differs from FIG. 5 in that the circumferential part 7' is embodied in conical fashion.

The invention is not limited by the embodiments described above which are presented as examples only but can be modified in various ways within the scope of protection defined by the appended patent claims.

We claim:

1. A welded vehicle wheel having an outer side and an inner side, comprising:

a rim having a bed region, wherein said bed region comprises a decreasing diameter toward the outer side; and a wheel disc having an outer circumference, a side wall area at the outer circumference of said wheel disc and a circumferential portion having a connected axial end facing and connected to said side wall area and a free axial end facing away from said side wall area, wherein said side wall area comprises an increasing diameter toward the inner side and said circumferential portion is disposed substantially axially;

said rim being connected to said wheel disc by a pressure-seat connection between said bed region and said circumferential portion and a welded seam between said free end of the circumferential portion and said bed region, wherein said pressure seat connection comprises an axially narrow zone proximate said connected end of said circumferential portion and wherein said pressure seat connection and said welded seam form an intermediate space axially therebetween continuous in a circumferential direction and having an expanding cross section toward the inner side.

2. The welded vehicle wheel claim 1 wherein said circumferential portion is axially disposed.

3. The welded vehicle wheel of claim 1, wherein said bed region comprises a conical section and an angle a corresponding to half of the conical angle of said conical section is not greater than 7 degrees.

4. The welded vehicle wheel of claim 1, wherein said circumferential portion comprises a decreasing diameter toward the inner side of said welded vehicle wheel.

5. The welded vehicle wheel of claim 4, wherein said bed region comprises a conical section and an angle α corresponding to half of the conical angle of said conical section is not greater than 7 degrees.

6. The welded vehicle of claim 4, wherein said circumferential portion comprises a conical section and an angle β corresponding to half of the conical angle of said conical section is not greater than 7 degrees.

7. The welded vehicle wheel of claim 1, wherein said bed region comprises a toroidal form such that a first area of bed region proximate said pressure seat connection comprises a first radius of curvature and a second area of said bed region axially inward of said first area comprises a second radius of curvature.

8. The welded vehicle wheel of claim 7, wherein said circumferential portion is axially disposed.

9. The welded vehicle wheel of claim 7, wherein said circumferential portion comprises a decreasing diameter toward the inner side of said welded vehicle wheel.

10. The welded vehicle wheel of claim 1, wherein said bed region comprises a radially outwardly extending bulge having a first radius of curvature and an area of said bed region proximate said pressure seat connection comprises a second radius of curvature, said first radius of curvature being one of equal to and not equal to said second radius of curvature.

11. The welded vehicle wheel of claim 10, wherein said circumferential portion is axially disposed.

12. The welded vehicle wheel of claim 10, wherein said circumferential portion comprises a decreasing diameter toward the inner side of said welded vehicle wheel.

13. The welded vehicle wheel of claim 1, wherein said axially narrow zone comprises a distance of 2–3 mm in an axial direction.

14. The welded vehicle wheel of claim 7, wherein said first radius of curvature is equal to said second radius of curvature.

15. The welded vehicle wheel of claim 7, wherein said first radius of curvature is not equal to said second radius of curvature.

* * * * *